United States Patent [19]

Kolmann

[11] 4,292,551
[45] Sep. 29, 1981

[54] OPTOELECTRONIC COUPLING DEVICE FOR TRANSMITTING DC SIGNALS

[75] Inventor: Ewald Kolmann, Munich, Fed. Rep. of Germany

[73] Assignee: Siemens Aktiengesellschaft, Berlin and Munich, Fed. Rep. of Germany

[21] Appl. No.: 103,434

[22] Filed: Dec. 14, 1979

[30] Foreign Application Priority Data

Jan. 29, 1979 [DE] Fed. Rep. of Germany ....... 2903327

[51] Int. Cl.³ .......................... H03F 17/00; H03K 5/04
[52] U.S. Cl. .................................... 307/311; 307/300; 307/DIG. 1; 250/551
[58] Field of Search ................ 307/311, 300, DIG. 1; 330/59, 308; 250/211 J, 551

[56] References Cited

U.S. PATENT DOCUMENTS

| 3,671,751 | 6/1972 | Korlge et al. | 250/211 J |
| 3,810,034 | 5/1974 | Brunsch | 330/59 |
| 3,893,037 | 7/1975 | Herbert | 330/59 |
| 3,943,367 | 3/1976 | Baker | 330/59 |
| 3,961,224 | 6/1976 | Vreeland | 307/311 |

FOREIGN PATENT DOCUMENTS 2061588 5/1972 Fed. Rep. of Germany .
2144537 6/1978 Fed. Rep. of Germany .

OTHER PUBLICATIONS

Optical Isolators Yield Benefits in Many Linear Circuits by Hodapp, Electronics, 3/76, pp. 105-110.

Primary Examiner—Stanley D. Miller, Jr.
Assistant Examiner—B. P. Davis
Attorney, Agent, or Firm—Spellman, Joel and Pelton

[57] ABSTRACT

There is disclosed an optoelectronic coupling device for transmitting digital signals from an input to an output, which input and output are electrically isolated from each other. An input stage includes an input for receiving digital input signals from an incoming signal line and an output. The input stage is connected to an optoelectronic coupling circuit comprising luminescent diodes and phototransistors arranged adjacent to respective ones of the luminescent diodes. Either the collectors or the emitters of both phototransistors are commonly connected to a first voltage source. The other leads of the phototransistors form outputs of the optoelectronic coupling circuit. An output stage, connected to these outputs, includes an operational amplifier having an output, a non-inverting input and an inverting input. Each of the non-inverting and inverting inputs are connected to one of the outputs of the optoelectronic coupling circuit. The output stage has also two ohmic resistors, each connecting a second voltage source with a respective one of the non-inverting and inverting inputs of the operational amplifier, and a capacitor connected between the non-inverting and inverting inputs. This capacitor and each of said resistors form RC circuits for removing a remaining charge of respective phototransistors when said phototransistors are cut off from saturation.

8 Claims, 2 Drawing Figures

OPTOELECTRONIC COUPLING DEVICE FOR TRANSMITTING DC SIGNALS

BACKGROUND OF THE INVENTION

The invention relates to an optoelectronic coupling device for transmitting digital signals from an input to an output, which input and output are electronically isolated from each other.

To transmit digital signals like telegraph signals transmission systems have been used which are composed of units having different signal characteristics. Because of these different signal characteristics, it is often necessary to isolate parts of the transmission system from each other electrically. It is well known to employ different kinds of relays for this purpose; however, relays have been replaced more and more by optoelectronic coupling devices which are less sluggish and which have less current consumption in addition to other advantages over relays.

One example of this kind of optoelectronic coupling device is known from the U.S. Pat. No. 3,810,034 to Brunsch. This U.S. patent discloses an apparatus for the transmission of direct current signals to an output circuit from an input circuit electrically isolated therefrom by means of optoelectronic coupling elements. To improve the transmission performance for high signaling speeds and to reduce distortions, an operational amplifier is connected to the output of the optoelectronic coupling circuit. Furthermore, both inputs of the operational amplifier are connected via a potentiometer, the tap of which having the same ground connection as the operational amplifier. By means of this potentiometer, the d.c. signals to be transmitted can be balanced symmetrically.

Such an adjustable potentiometer has to be readjusted manually. In addition to this disadvantage, the known optoelectronic signal coupler may not be well suited if optoelectronic circuits with phototransistors instead of photodiodes will be used; since phototransistors have, to a high degree, differing switching times, if they are switched on or cut off. The different characteristics, in switch-on time and cut-off time depend on a cut-off delay of a saturated phototransistor which is longer than the delay-time during the switch-on operation.

It is, therefore, an object of this invention to provide an improved optoelectronic coupling device for transmitting digital signals, the coupling stage of which device is built up with phototransistors.

Another object of the invention is to provide an optoelectronic coupling device which is to be operated at high transmission speeds.

A further object of the invention is to provide an optoelectronic coupling device which is automatically readjusted and which is operable with different signal levels, especially in that combination of different signal levels at the input and the output.

SUMMARY OF THE INVENTION

The aforementioned and other objects of this invention are achieved with an optoelectronic coupling device composed of an input stage connected to an incoming signal line, an optoelectronic coupling circuit and an output stage connected to an outgoing signal line. The input stage preferably has amplifying means to supply digital input signals to the input of the optoelectronic coupling circuit. This circuit comprises luminescent diodes and phototransistors; each phototransistor arranged adjacent to a respective luminescent diode. The phototransistors are controlled by the optical output signals of the respective luminescent diodes. The output stage has an operational amplifier, the inputs of which amplifier are connected to respective phototransistor outputs and to a positive supply voltage via respective ohmic resistors. Furthermore, the inputs of the operation amplifier are connected via a capacitor.

Phototransistors usually have different switch-on and cut-off characteristics. Since this disadvantage would result in a distortion of digital signals processed in the optoelectronic coupling device, phototransistors do not seem to be suitable for this purpose. However, this disadvantage is overcome by RC circuits which are formed by the capacitor and one of the two ohmic resistors in the input circuit of the operational amplifier of the output stage. When the signal level changes the phototransistor which is conductive has to be cut off. As this phototransistor was saturated in its conductive stage, there remains a charge when this phototransistor is being cut off. This charge is removed by means of one of these RC circuits as soon as the second phototransistor is switched on to become conductive.

This circuit arrangement has the advantage of avoiding the troublesome influence of the different switch-on and cut-off characteristics of the phototransistors. Furthermore, the annoying influence of the ambient temperature and an inference of tolerances of supply voltages are eliminated. The transmission of signals through the optoelectronic coupling device is characterized only by the switch-on characteristic of the optoelectronic coupling circuit.

An optoelectronic coupling device in accordance with the invention may furthermore comprise a respective operational amplifier arranged in the output stage and the input stage. By this design the optoelectronic coupling device can match different signal levels on the incoming signal line connected to the input and on the outgoing signal line connected to the output of the optoelectronic coupling device, respectively. Additionally, the current consumption of the optoelectronic coupling device designed according to the invention is very small, so that a low rated transducer may be used as source for the supply voltages.

BRIEF DESCRIPTION OF THE DRAWINGS

For a full understanding of the present invention reference should now be made to the following detailed description of one preferred embodiment of the invention in conjunction with the accompanying drawings, wherein.

DETAILED DESCRIPTION OF THE DRAWINGS

Figure 1:
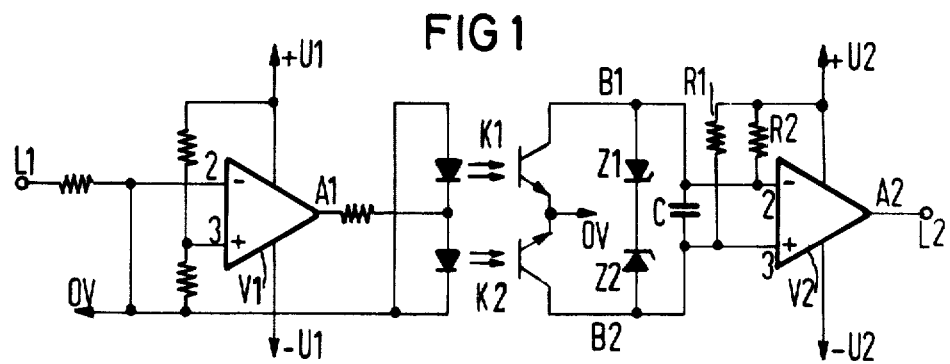
FIG. 1 is a circuit diagram of an optoelectronic coupling device used as an outgoing circuit in a transmission system.

FIG. 1 illustrates an optoelectronic coupling device to be useful as an apparatus for transmitting of ditigal signals from an incoming signal line L1 to an outgoing signal line L2 which signal lines are electrically isolated from each other. The optoelectronic coupling device has an input stage with a first operational amplifier V1 being supplied by a first voltage source ±U1 and having an inverting input 2 and a non-inverting input 3. The incoming signal line L1 is fed to a load resistor which in turn is connected to the inverting input 2 of the operational amplifier V1 and connected to another voltage source supplying zero Volts to the device. A series connection of two ohmic resistors having a connector tap is inserted between the positive pole +U1 of the first voltage source. The connector tap of which series connection of ohmic resistors is connected to the non-inverting input 3 of the operational amplifier V1. The operational amplifier V1 is by means of this input circuit controlled by digital input signals transmitted on the incoming signal line L1.

The operational amplifier V1 has an output A1 which is connected to the input of an optoelectronic coupling circuit via an ohmic load resistor. This optoelectronic coupling circuit has two coupling stages K1 and K2. Each coupling stage consists of a luminescent diode and a phototransistor arranged adjacent the diode. The two luminescent diodes are connected in series by a connector tap which is the input of the optoelectronic coupling circuit. The other connectors of the luminescent diodes are commonly connected to the voltage source which supplies 0 V. The two phototransistors having collectors and emitters, which emitters are commonly connected to the zero V voltage source. The collectors forming outputs of the optoelectronic coupling circuit are connected to an output stage.

This output stage has a second operational amplifier V2 and is supplied by a third voltage source ±U2. The operational amplifier V2 also has inverting and non-inverting inputs 2 and 3 and an output A2. The output A2 is connected to the outgoing signal line L2. Each of the inputs 2 and 3 of the operational amplifier V2 are connected with a respective one of the collectors of the phototransistors. Furthermore, both inputs 2 and 3 of the operational amplifier are coupled by a capacitor C and are connected via a respective ohmic resistor R2 and R1 to a positive pole ±U2 of the third voltage source. In parallel to the capacitor C, both inputs 2 and 3 of the operational amplifier V2 are coupled to each other by a series connection of two zener diodes Z1 and Z2 which are connected back-to-back.

The function of this optoelectronic coupling device will be described now in reference to a set of graphs of FIG. 2.

As is very well known, operational amplifiers generally provide a positive output signal if a voltage supplied to the non-inverting input is more positive than the voltage applied to the inverting input. Operational amplifiers provide a negative output signal if the state of the signals applied to the inverting and non-inverting input are reversed. Therefore, an operational amplifier has a threshold sensitivity.

Supposing now that the digital signal incoming on the signal line L1 has a negative value, this will result in a positive signal at the output A1 of the first operational amplifier V1. This state of the signal condition at the output A1 is shown at the right hand side of the graph in the first line of FIG. 2. In this operating condition, the optoelectronic coupling stage K2 is operable. The respective luminescent diode is beaming and the adjacent phototransistor is conductive. The phototransistor of the other coupling stage K1 is cut-off in this case. Line 2 and 3 of FIG. 2 illustrate the voltage levels at collector connectors B1 and B2, respectively. Depending on this operating condition the non-inverting input of the second operational amplifier V2 receives a more negative voltage than the inverting input 2, so that the second operational amplifier V2 emits a negative signal at the output A2. This operating condition is illustrated by the graph of the line 4 in FIG. 2.

Figure 2:
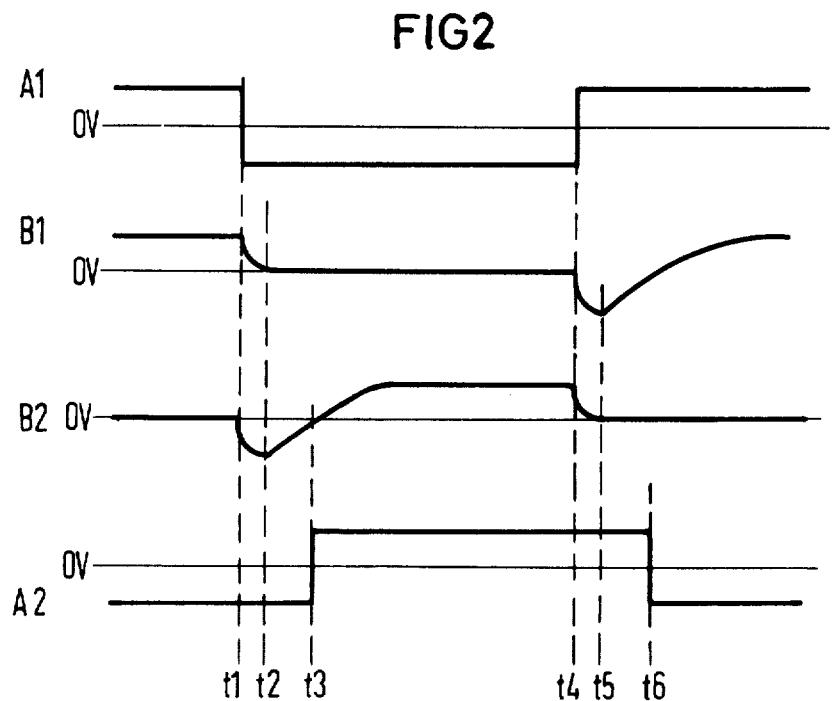
FIG. 2 is a set of graphs which show schematically the voltage variation at selected points of the circuit of FIG. 1.

According to the example illustrated in FIG. 2 the operating condition of the incoming digital signal changes and the first operational amplifier generates a negative signal at the output A1 at a time t1. Because of this change of the output signal, the first stage K1 of the optoelectronic coupling circuit is now becoming conductive. Normally, the cut-off delay of the saturated phototransistor which has been conductive during the previous time period is longer than the delay of the switch-on phase of the previously reverse biased phototransistor so that both phototransistors are conductive for a short period of time. This period is kept definite and short by the specific design of the optoelectronic coupling device. The phototransistor which is becoming conductive after a change of the operating condition serves to remove the remaining charge of the saturated other phototransistor which has to be cut off. This removal of the charge is enforced by means of the capacitor C which, in turn, changes its own state of charge.

The graph in line 3 of the FIG. 2 illustrates that by means of the capacitor C the charge of the previously conducting phototransistor K2 is already removed at a time t2. The voltage at the collector connector B2 rises then with a timing constant which is defined by the values of the capacitor C and the ohmic resistor R1. This voltage is applied to the non-inverting input 3 of the operational amplifier V2. At that time, according to the graph in line 2 of FIG. 2, the voltage applied to the inverting input 2 of the operational amplifier has a value of about 0 V as the other phototransistor of the optoelectronic coupling stage is already conductive at that time.

At a time t3, the voltage at the collector connector B2 of the previously conducting phototransistor exceeds the value of 0 V. This results in a change of the operating condition of the operational amplifier V2 and, as may be seen from the graph in the fourth line of FIG. 2, the output signal at the output A2 of the operational amplifier V2 changes the polarity accordingly.

Comparable actions will take place at times t4, t5 and t6 when the incoming signal pulse on the incoming signal line L1 again will change the condition. At the output A1 of the first operational amplifier V1 then again the positive output signal will be present. In this case, the rise of the voltage at the collector connector B1 of the phototransistor which will then be cut off is determined by the values of the capacitor C and the second ohmic resistor R2 connected to the inverting input 2 of the second operational amplifier V2. Since both RC circuits are composed of the same capacitor C, the tolerances of this capacitor are not critical in respect to a delay or a distortion of the coupled signal pulse. However, the values of the ohmic resistors R1 and R2 should be matched to perform the same time constant.

The zener diodes Z1 and Z2 perform a protective function. They prevent the inputs 2 and 3 of the operational amplifier V2 from excessive voltages. In any operating condition one of the zener diodes is forward biased; and the protective circuit of the zener diodes connected in series becomes conductive if the zener voltage of the back biased zener diode is reached.

The design of the optoelectronic coupling device with operational amplifiers employed in the input stage and the output stage has the advantage to match different requirements of signal potentials at the input and the output of the optoelectronic coupling device. For example, the input stage can be connected to a signal line which is part of an electronic circuit arrangement composed of TTL components. The output signal line may have different signal potentials according to the requirements of a long distance transmission system.

While the design of the optoelectronic coupling device herein described before constitutes a preferred embodiment of the invention, it is to be understood that the invention is not restricted to this precise form of a coupling device, and that a variety of changes may be made therein without departing from the scope of the invention.

I claim:

1. An optoelectronic coupling device for transmitting digital signals from an input to an output, which input and output are electrically isolated from each other, said coupling device comprising in combination:
   (a) an input stage including an input for receiving digital input signals from an incoming signal line and an output;
   (b) an optoelectronic coupling circuit including:
      (1) two luminescent diodes connected in series via a connector tap, said connector tap being connected to the output of said input stage; and
      (2) two phototransistors arranged adjacent to respective ones of said luminescent diodes and having collectors and emitters, one of said collectors and said emitters of both phototransistors commonly connected to a first voltage source;
   (c) an output stage including:
      (1) an operational amplifier having an output, a non-inverting input and an inverting input, said non-inverting and inverting inputs each being connected to one of said emitters and collectors of both phototransistors not being connected to the first voltage source;
      (2) two ohmic resistors, each connecting a second voltage source with a respective one of said non-inverting and inverting inputs of the operational amplifier; and
      (3) a capacitor connected between said non-inverting and inverting inputs;
   whereby said capacitor and respective ones of said resistors form RC circuits for removing a remaining charge of respective phototransistors when said phototransistors are cut off from saturation.

2. An optoelectronic coupling device as recited in claim 1, wherein said first voltage source supplies zero volts.

3. An optoelectronic coupling device as recited in claim 1, wherein said second voltage source supplies a positive voltage.

4. An optoelectronic coupling device as recited in claim 1, wherein the ohmic resistors of the output stage have the same resistance values.

5. An optoelectronic coupling device as recited in claim 1, wherein the input stage further comprises a second operational amplifier having a non-inverting input and an inverting input, both of which are coupled to said input of said input stage and further having an output coupled to said output of said input stage, said operational amplifier being supplied by a third voltage source;
   whereby said operational amplifier is controlled by the incoming digital signal to provide an output signal to the connector tap of the luminescent diodes.

6. An optoelectronic coupling device as recited in claim 5, wherein the input stage further comprises:
   (a) a load resistor at the input of said input stage, said input being connected to the inverting input of the operational amplifier and the first voltage source;
   (b) two ohmic resistors connected in series via a connector tap, said resistors being arranged between the positive pole of the third voltage source and the first voltage source; and
   (c) said connector tap being connected to the non-inverting input of the operational amplifier; and
   (d) the output of said operational amplifier being connected via another load resistor to the connector tap of the luminescent diodes, which diodes in turn are commonly connected to the first voltage source.

7. An optoelectronic coupling device as recited in claim 1, wherein the output stage further comprises two zener diodes connected in series back-to-back, which zener diodes, in turn, are connected to the non-inverting and inverting inputs of the operational amplifier of the output stage.

8. An optoelectronic coupling device as recited in any one of the claims 5 to 7, wherein the input stage and the output stage further comprise second and third voltage sources of different values.

* * * * *